Figure 4:
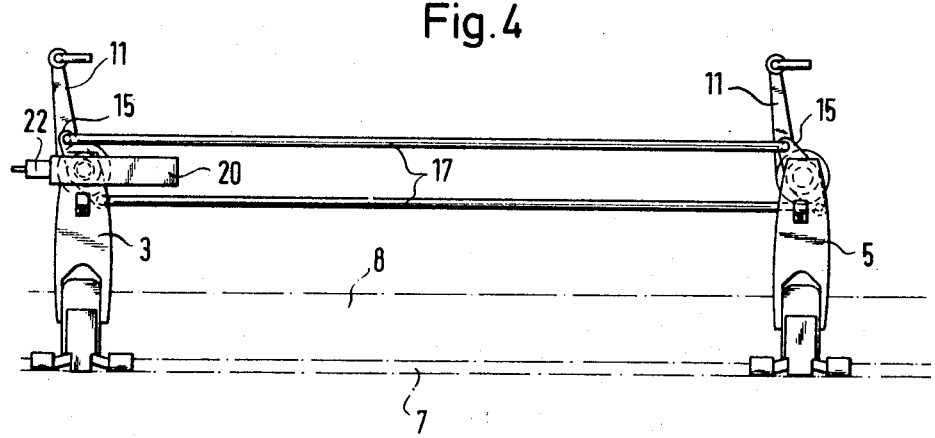

United States Patent
Marker

[11] 3,710,998
[45] Jan. 16, 1973

[54] LOCKABLE SKI CARRIER FOR MOTOR VEHICLES

[76] Inventor: Hannes Marker, Hauptstrasse 51-53, Garmisch-Partenkirchen, Germany

[22] Filed: Aug. 4, 1970

[21] Appl. No.: 60,848

[30] Foreign Application Priority Data

Aug. 11, 1969 Germany..................P 19 40 861.8

[52] U.S. Cl............................224/42.1 F, 211/60 SK
[51] Int. Cl.................................B60r 9/12
[58] Field of Search........224/42.1 E, 42.1 F, 42.1 G, 224/42.1 H, 42.1 B, 42.1 D, 42.1 R; 248/361 B; 211/60 R, 60 SK

[56] References Cited

UNITED STATES PATENTS

| | | | |
|---|---|---|---|
| 3,348,747 | 10/1967 | Vuarchex | 224/42.1 F |
| 3,325,069 | 6/1967 | Fulton | 224/42.1 F |
| 3,239,115 | 3/1966 | Bott | 224/42.1 F |

FOREIGN PATENTS OR APPLICATIONS

| | | | |
|---|---|---|---|
| 1,026,451 | 2/1953 | France | 224/42.1 F |

*Primary Examiner*—Gerald M. Forlenza
*Assistant Examiner*—George F. Abraham
*Attorney*—Fleit, Gipple & Jacobson

[57] ABSTRACT

Two U-shaped carrying members are supported, e.g., with their legs, in the gutters of the roof of the car and serve to hold at least two pairs of skis. Each U-shaped carrying member comprises for each pair of ski at least one locking element. These locking elements can be jointly moved and jointly locked in an operative position. An actuating member for actuating the locking elements of one U-shaped carrying member is positively connected by at least one coupling member to an actuating member for the locking elements of the other U-shaped carrying member. A common handle and a common locking device adapted to be locked up by a lock are provided for both actuating members.

12 Claims, 7 Drawing Figures

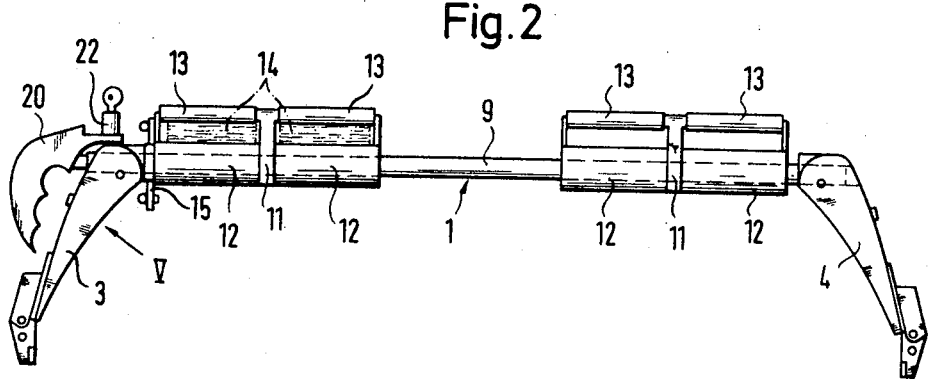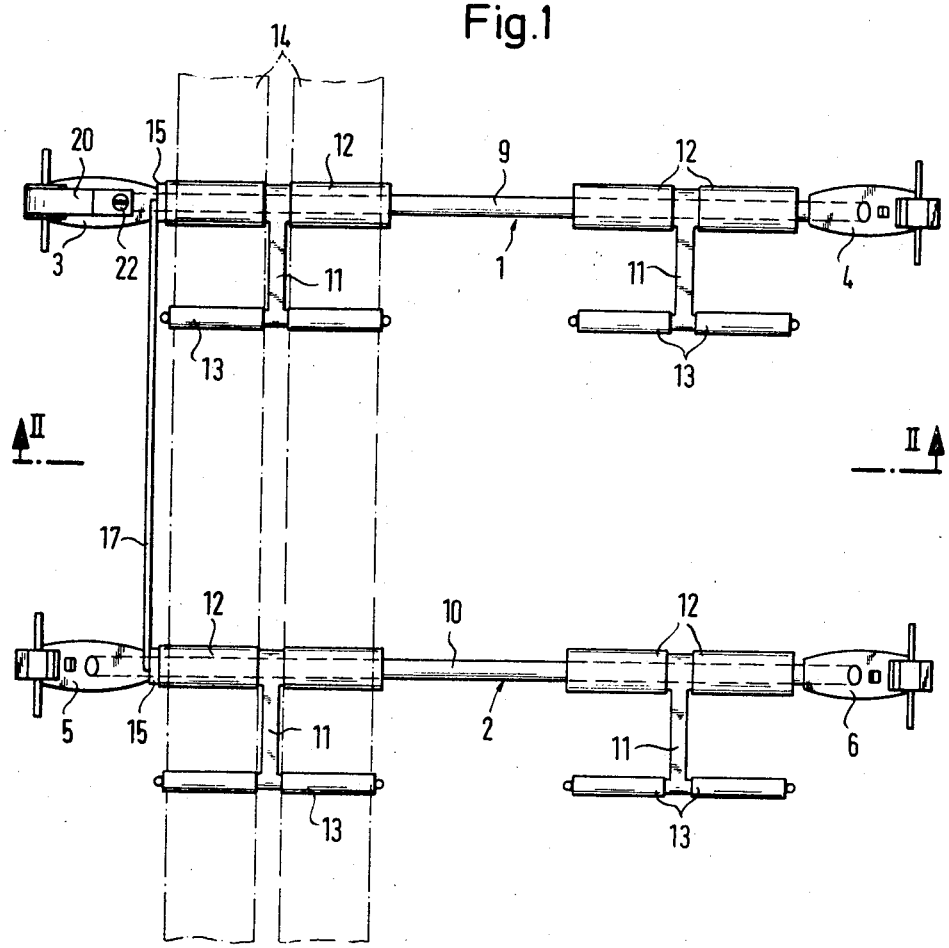

LOCKABLE SKI CARRIER FOR MOTOR VEHICLES

The present invention relates to lockable ski carriers for motor vehicles, which ski carriers comprise two U-shaped carrying members, which are supported, e.g., with their legs, in the gutters of the roof of the car and serve to hold at least two pairs of skis, each U-shaped carrying member comprising for each pair of ski at least one locking element, which locking elements can be jointly moved and can be jointly locked in an operative position.

Such ski carriers have been described in prior applications. In these known ski carriers, the U-shaped carrying members are mounted on the roof of the car independently of each other. Each U-shaped carrying member is provided with a separate actuating member and the latter is provided with a handle for a joint actuation of the locking elements associated with said U-shaped carrying member. This arrangement has been found unsatisfactory because a separate operation is required at each U-shaped carrying member when the skis are to be secured to or detached from the U-shaped carrying members; these separate operations involve a certain complication. To prevent an unauthorized removal of the skis from the skier, each U-shaped carrying member must be provided with a lock and each lock must be individually locked and opened. In addition to the time-consuming operation which is involved, these ski carriers have also the disadvantage that they constitute a relatively large structural expenditure and are expensive.

It is an object of the present invention to avoid the disadvantages of the described ski carrier in a simple manner.

In a lockable ski carrier for motor vehicles, which ski carrier comprises two U-shaped carrying members, which are supported, e.g., with their legs, in the gutters of the roof of the car and serve to hold at least two pairs of skis, each U-shaped carrying member comprising for each pair of ski at least one locking element, which locking elements can be jointly moved and jointly locked in an operative position, the object of the invention is accomplished according to the invention in that an actuating member for actuating the locking elements of one U-shaped carrying member is positively connected by at least one coupling member to an actuating member for the locking elements of the other U-shaped carrying member and a common handle and a common locking device adapted to be locked up by a lock are provided for both actuating members. With that arrangement, the locking elements of both U-shaped carrying members can be opened and closed with a single manipulation and contrary to the lockable ski carriers described hereinbefore there is no need for two handles and two locks for the respective U-shaped carrying members.

If the crosspiece of each U-shaped carrying member is rotatably and axially nondisplaceably mounted in the legs of the U-shaped carrying member and said crosspiece serves as an actuating member for all locking elements, which consist of clamping members mounted on the crosspiece, a lever is nonrotatably secured to the crosspiece of each U-shaped carrying member and a connecting rod constituting the coupling member is pivoted to the free ends of these levers and ensures that the crosspieces of both U-shaped carrying members will rotate in unison so that all clamping members of the two U-shaped carrying members are moved in unison.

It will be desirable if the connecting rod is always held parallel to itself by the two levers. This requirement is met in that the levers are also parallel and of equal length.

It has been found particularly desirable to provide the levers in the form of two-armed levers and to interconnect them by two connecting rods disposed on opposite sides of the straight line which connects the fulcrums of the levers so that the levers and the connecting rods form a parallelogram.

In a modification of that feature of the invention, the connecting rods may be replaced by ropes or chains so that, for instance, the detached ski carrier can easily be carried or stowed away within a small space in the luggage compartment of the car.

In another embodiment of the ski carrier, the actuating member for the locking elements of a U-shaped carrying element consists of a push rod, which is movable in the longitudinal direction of the U-shaped carrying member, and the two push rods of the two U-shaped carrying members are rigidly interconnected by a coupling cross-member so that the movement of the push rod of one U-shaped carrying member is transmitted to the push rod of the other U-shaped carrying member and is thus simultaneously transmitted to all locking elements.

In a development of the invention, the actuating members may be positively connected by a coupling member in all embodiments not only on the actuating side but also on the other side, e.g., in order to stiffen the ski carrier.

The handle is preferably provided on one of the two actuating members. In a structurally simple embodiment, the coupling member itself may serve as a handle.

According to another feature of the invention, each leg of each U-shaped carrying member of the ski carrier may be provided with fixing means for a fixation to the roof gutter and each fixing means may be locked against separation from the roof by a locking rod, which is held against displacement by one of the actuating members when the locking elements are in operative position. This arrangement will prevent an unauthorized removal of the ski carrier together with the skis from the roof of the car.

The legs of the U-shaped carrying members are preferably held in position by a fixing bracket, which engages the gutter from below and which is operated by a clamping lever, which is locked in clamping position by the locking rod.

In a development of the last-mentioned feature of the invention, it has been found desirable to provide the clamping lever in the form of a housing, which is pivoted to the leg of the U-shaped carrying member above supporting arms provided on the leg of the U-shaped carrying member and extending into the gutter, to provide the housinglike clamping lever at its upper end with a tongue, which in the clamping position of the clamping lever extends into an opening of the leg of the U-shaped carrying member and which has at its free end a bore for receiving the locking rod, and to provide the upper part of the fixing bracket also in the form of a housing, which is pivoted by a pivot in the housinglike clamping lever and which by means of slots is mounted in said housinglike clamping lever to permit of a movement of the fixing bracket in its longitudinal direction against the force of a spring, which engages at one end the fixing bracket and at the other end the pivot.

In a suitable embodiment of these fixing means for a fixation to the gutter, the pivot of the fixing bracket is rotatably and axially non-displaceably mounted in the housinglike clamping lever and a middle portion of said pivot constitutes a spring abutment, which is provided with a guide pin for guiding a helical compression spring, which at its other end bears on a transverse wall of the housinglike upper portion of the fixing bracket.

If the fixing means for a fixation to the roof gutter comprise a fixing nut, the latter may have at least one hole for receiving a locking rod, which locks the nut against rotation.

Particularly for design reasons, it has proved desirable to provide each leg of each U-shaped carrying member with a locking rod, which is longitudinally slidably mounted in said leg and urged to its locking position by a spring, and to provide said locking rod with a slider, which extends outwardly through an opening in the leg of the U-shaped carrying member. By means of that slider, the locking rod can easily be lifted from its locking position against the force of the spring if the locking elements are in an inoperative position and the upper end portion of the locking rod can be pushed into a hole of the fixing elements.

Figure 3:
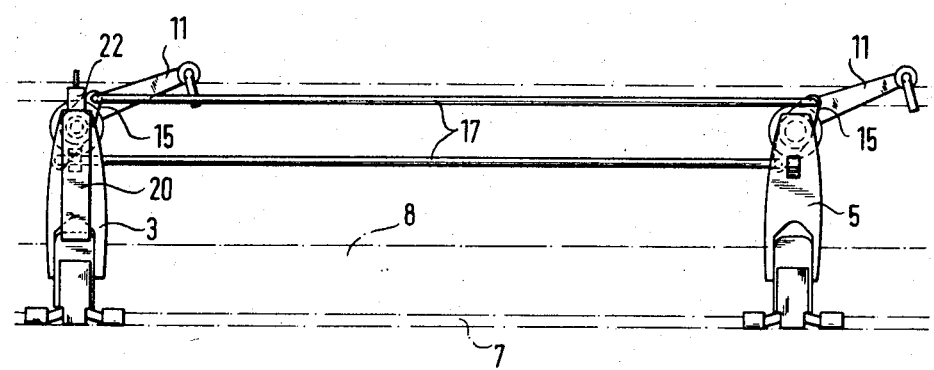
Figure 5:
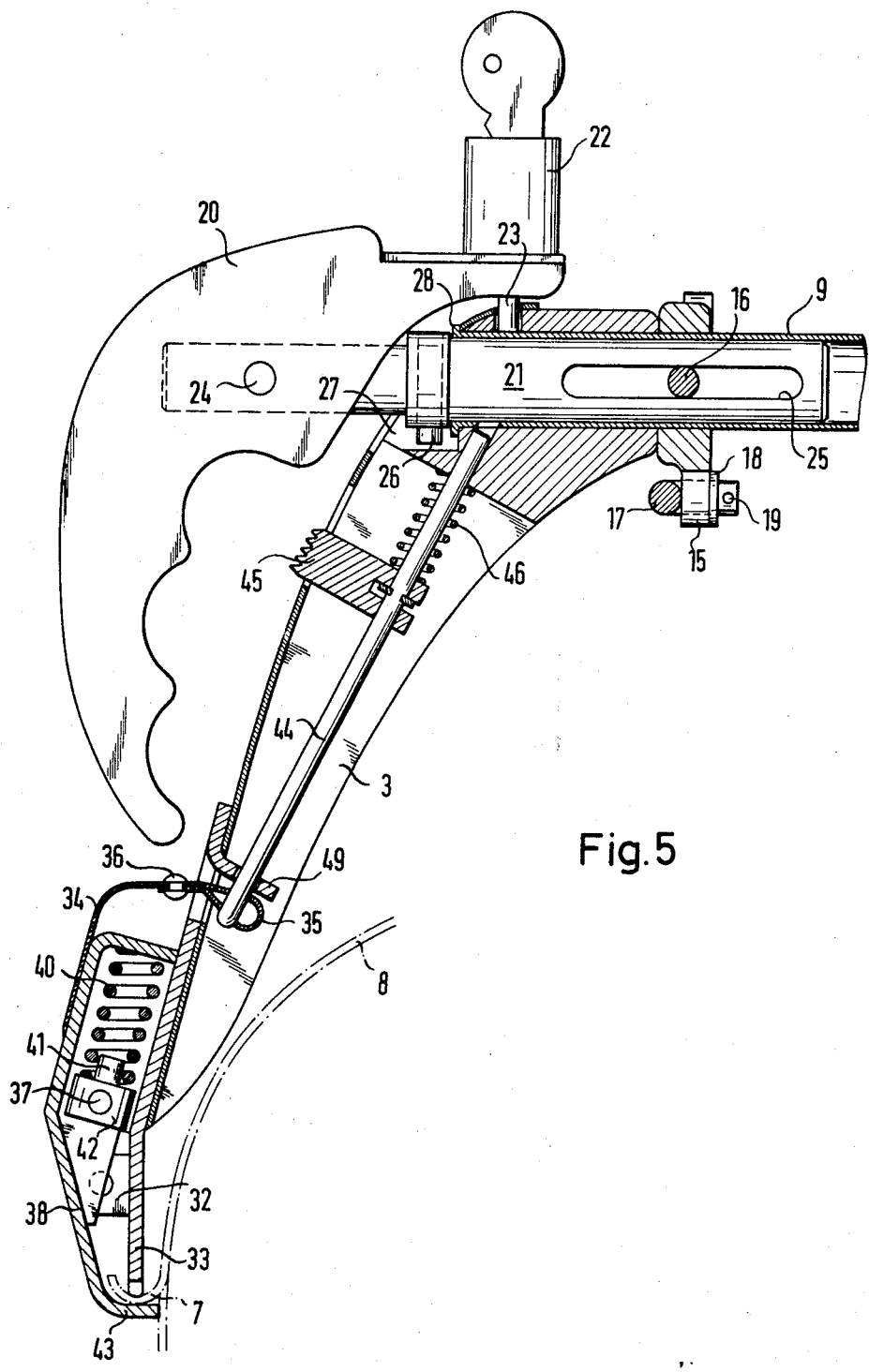
Figure 6:
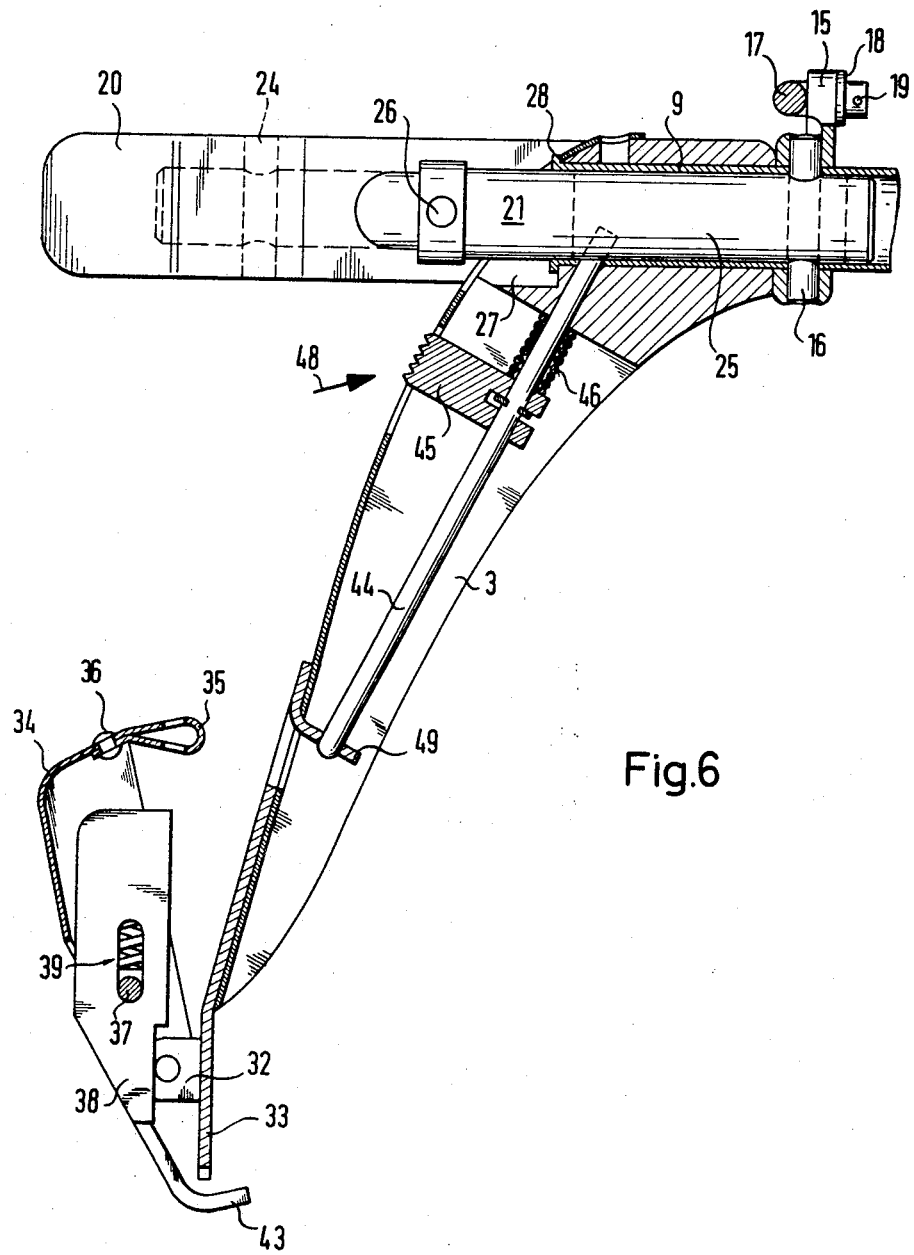
Figure 7:
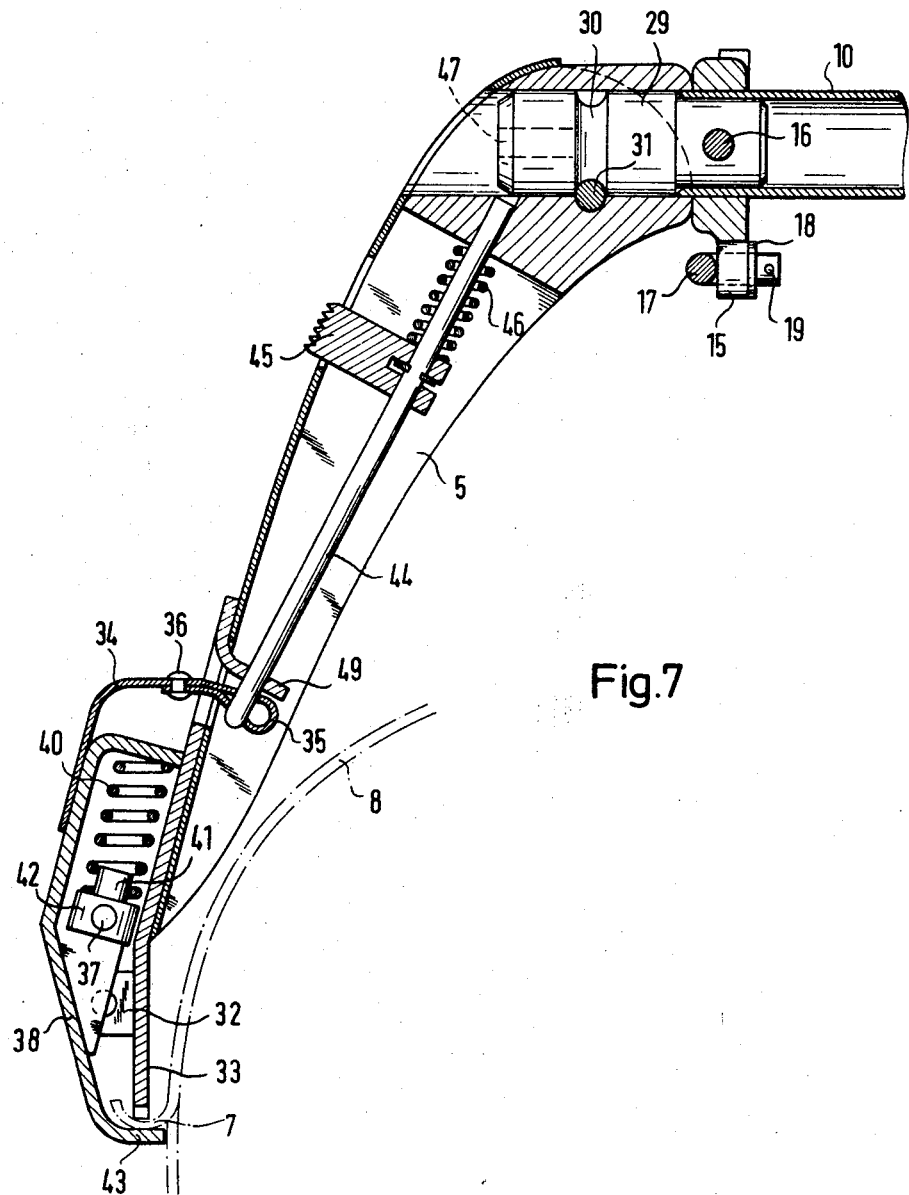

An embodiment of the invention will now be fully described with reference to the accompanying drawings, in which FIG. 1 is a top plan view showing a lockable ski carrier according to the invention for use with motor vehicles, the ski carrier being in a closed condition, FIG. 2 is a sectional view taken on line II—II in FIG. 1, FIG. 3 is a side elevation showing the ski carrier of FIG. 1, FIG. 4 is a side elevation similar to FIG. 3 and shows the ski carrier in an open condition, FIG. 5 is an enlarged view showing in elevation the portion V in FIG. 2 but cut open, FIG. 6 is an elevation similar to FIG. 5 and shows the ski carrier in an unlocked condition and FIG. 7 is a vertical sectional view on the same scale as FIGS. 5 and 6 and shows that portion of the other U-shaped carrying member which corresponds to the portion V.

The ski carrier shown in FIGS. 1 to 4 comprises two U-shaped carrying members 1 and 2, each of which comprises two legs 3, 4 or 5, 6, which are supported in the gutters 7 of the roof 8 of the car. The crosspiece of each U-shaped carrying member 1 or 2 consists of a tube 9 or 10, which at its ends is rotatably but axially non-displaceably mounted in the legs 3, 4 or 5, 6 of the U-shaped carrying members. This mounting will be described more fully hereinafter. Two locking elements in the form of two clamping members 11 are mounted on each tube 9, 10. The clamping members 11 are T-shaped and at the free ends of their stem are secured to the tube 9 or 10. Rubber tubes 12 are fitted on each of the tubes 9 and 10 and disposed on opposite sides of these free stem ends. The crosspiece of each clamping member 11 is covered by similar rubber tubes 13 for a compensation of differences between the thickness of different skis. Two pairs of skis 14 can be held by each clamping member 11. The crosspieces of the clamping members have angled end portions, which extend downwardly when the clamping members 11 are in the position shown in FIGS. 1 to 3 so that a lateral pulling of the skis out of the ski carrier is prevented when the clamping members are in their clamping position.

On the left side of the ski carrier in FIGS. 1 and 2, two-armed levers 15 are secured to the tubes 9 and 10 beside the bearing eyes of the legs 3 and 5 of the U-shaped carrying members. Each lever 15 is secured to the tube 9 or 10 by a pin 16, see FIGS. 5-7, which extends through the tube 9 or 10. Each of these identical levers 15 has in its free end portion a bore, the angled end portions of two connecting rods 17 of equal length extend through these bores. Each of these angled connecting rod end portions is held by a washer 18 and a locking pin 19 against being pulled out of the bore. The levers 15 are positively connected by the connecting rods 17.

FIGS. 1 to 3 show the locking elements or clamping members 11 in a clamping position, in which they firmly force the skis 14 against the U-shaped carrying members. In order to move the clamping members 11 to the position shown in FIG. 4, the tubes 9 and 10 must be turned. This is accomplished by means of a two-armed handle 20, which by means of a shaft 21 is connected to the tube 9 (see FIG. 5). One arm of the handle 20 consists of a grip. A lock 22 is secured to the other arm.

FIG. 5 shows the lock 22 in locking position, in which its locking bolt 23 extends into an opening of the leg 3 of a U-shaped carrying member. The handle 20 is secured by a pin 24 to one end of the shaft 21, which at its other end is inserted into the tube 9, in which the shaft is nonrotatably and axially slidably mounted. For this purpose, the shaft 21 comprises a slot 25, through which the pin 16 of the two-armed lever 15 extends. FIG. 5 shows the shaft 21 in inserted position, in which a rotation of the shaft 21 and of the tube 9 is prevented by a locking pin 26, which is secured to the central portion of the shaft 21 and extends beyond the periphery of the shaft and in the tube 9 into a recess 27 in the leg of the U-shaped carrying member. When the lock 22 has been opened, the shaft 21 must be pulled out of the tube 9 and the locking pin 26 must be removed from the recess 27 before the handle 20 can be rotated to the position shown in FIG. 6 to move the clamping members 11 to the position shown in FIG. 4.

The tube 9 is axially fixed in the leg 3 of the carrying member in that the tube 9 has a collar 28 at that end, shown in FIGS. 5 and 6, which is mounted in the bearing bore of the leg 3 of the U-shaped carrying member. The collar 28 bears on the leg of the U-shaped carrying member. The mounting of the tube 10 in the leg 5 of the U-shaped carrying member is shown in FIG. 7. A stub shaft 29 has an end portion which extends into the tube 10 and is held by the pin 16 of the two-armed lever 15. The free end of the stub shaft 29 is rotatably and axially nondisplaceably mounted in the bearing bore of the leg of the U-shaped carrying member. For this purpose, the stub shaft 29 comprises an annular groove 30, which receives a portion of a pin 31, which extends transversely to the leg 5 of the U-shaped carrying member. On that side of the ski carrier which is opposite to the actuating side, the tubes 9 and 10 are mounted in the leg 5 of the U-shaped carrying member as has been described and is shown for the tube 10, except that the pin 16 is replaced by a pin, not shown, which is riveted in the tube 9 or 10.

As is shown in more detail in FIGS. 5, 6, and 7, each of the legs 3, 4, 5, 6 of the U-shaped carrying members is provided with fixing means for a fixation to the gutter. A clamping lever 34 consisting of a U-shaped housing is rotatably riveted to two lugs 32 of supporting arms 33, which form the lower portions of respective legs of the U-shaped carrying members and are supported in the gutter 7. This housinglike clamping lever 34 is provided at its upper portion with a tongue 35, which in the clamping position of the clamping lever 34 extends into an opening of the leg of the U-shaped carrying member. The tongue 35 is stiffened because it consists of a lug which has been formed into a loop and is held in this configuration by a rivet 36. The tongue has a free end portion formed with a bore. A pivot 37 is rotatably and axially nondisplaceably mounted in the side walls of the housinglike clamping lever 34 and within the latter carries a fixing bracket 38, which consists also of a housing. The pivot extends through two slots 39 in the side walls of the fixing bracket 38 so that the latter can be longitudinally displaced against the force of a helical compression spring 40. The latter is normally prestressed to some extent and bears at one end on the transverse top wall of the housinglike fixing bracket 38 and at the other end by means of a spring abutment block 40, provided with a guide pin 41, on the pivot 37. As the fixing means for the fixation to the gutter are closed, the lower portion 43 of the fixing bracket 38 engages the gutter 7 from below to clamp the latter against the supporting arms 33. A considerable clamping action is produced by the further compression of the helical compression spring.

A locking rod 44 is axially slidably mounted in each of the legs 3, 4, 5, 6 of the U-shaped carrying members. These legs have channel-shaped central portions. The upper portion of each leg of a U-shaped carrying member has a bore, which opens into the bearing bore for the tube and receives the upper end of the locking rod 44. The other end of the locking rod is guided in a bore in an inwardly angled lug 49 of the leg of the U-shaped carrying member. A slider 45 is secured to the locking rod 44 and extends outwardly through an opening in the leg of the U-shaped carrying member. This slider 45 is loaded by a helical compression spring 46, which surrounds the locking rod 44 and bears on the upper portion of the leg of the U-shaped carrying member to hold the locking rod 44 in a position in which its lower end portion extends into the bore in the tongue 35 of the clamping lever 34 when the same is in clamping position.

As is apparent from FIGS. 5 and 7, the locking rods 44 cannot be moved upwardly when the clamping members 11 are in a clamping position, in which the shaft 21 and the stub shafts 29 lock the rods 44 against a movement in that direction. As is shown in FIG. 6, the connecting rods can be pushed into the slot 25 of the shaft 21 and into a recess 47 in each stub shaft 29 (see FIG. 7) when the clamping members 11 are in their open position and the tubes 9 and 10 have been rotated. The connecting rods are moved by means of the slider 45, which is forced upwardly in the direction of the arrow 48 against the force of the helical compression spring 46. As is shown in FIG. 6, the clamping lever 34 can then be swung outwardly to release the fixing means from the gutter.

The ski carrier which has been described can be operated in a very simple manner. When the lock 22 has been opened, the handle 20 is operated to pull the shaft 21 out of the tube 9 and to turn the shaft 21. As a result, all clamping members 11 perform a pivotal movement to their open position. The skis can now be placed onto the U-shaped carrying members. When the handle is then turned back, the clamping members 11 return to their clamping position. Thereafter, the shaft 21 is pushed back into the tube 9. When the lock 22 has been locked it is no longer possible to remove the skis from the roof of the car individually or together with the ski carrier without a destruction of the ski carrier or the gutters of the roof of the car because the locking rods 44 are now also locked against being lifted and lock the fixing means for the fixation to the gutters. For an authorized removal of the skis, the lock must be opened and the above operations be performed in the opposite sequence.

What is claimed is:

1. A lockable ski carrier for motor vehicles, which ski carrier comprises two U-shaped carrying members having legs for supporting the carrying members in the gutters of the roof of the vehicle and which carrying members serve to hold one or more pairs of skis, each U-shaped carrying member including at least one locking element for each pair of skis, said locking elements being operatively associated with each other to be jointly movable and jointly lockable in positions for locking the skis in fixed locations on said carrying members by means including at least one coupling member, actuating members connected to said coupling member and operatively associated with said locking elements for actuating the locking elements of said U-shaped carrying members, and a common handle and a common locking device provided in operative relationship with said actuating members and with said coupling member to enable movement of said actuating members and said coupling member by movement of said handle when said locking device is unlocked.

2. A ski carrier according to claim 1, wherein each said carrying member includes a crosspiece and wherein the crosspiece of each of said U-shaped carrying members is rotatably and axially nondisplaceably mounted in the legs of the U-shaped carrying member and said crosspiece serves as an actuating member for all said locking elements, which include clamping members mounted on the crosspiece, and wherein a lever is nonrotatably secured to the crosspiece of each said U-shaped carrying member and a connecting rod constituting the coupling member is pivoted to the free ends of said levers.

3. A ski carrier according to claim 2, characterized in that the levers are made equally long and are mounted parallel to one another.

4. A ski carrier according to claim 3, characterized in that the levers are comprised of two-armed levers, and two connecting rods interconnecting said levers and disposed on opposite sides of a straight line connecting the fulcrums of the two armed levers so that the levers and the connecting rods form a parallelogram.

5. A ski carrier according to claim 1, characterized in that two of said coupling members are provided and that the actuating members are positively connected by said coupling members not only on the actuating side but also on the other side.

6. A ski carrier according to claim 1, characterized in that the handle is provided on one of the two actuating members.

7. A ski carrier according to claim 1, in which the U-shaped carrying member has limbs that are provided with fixing means for a fixation to the roof gutter, a locking rod, each said fixing means being locked against separation from the roof by said locking rod, which is held against displacement by one of the actuating members when the locking elements are in operative position.

8. A ski carrier according to claim 7, wherein said fixing means include a fixing bracket and wherein the legs of the U-shaped carrying members are held in position by said fixing bracket, which engages the gutter from below, a clamping lever cooperating to operate said fixing bracket, said clamping lever being locked in clamping position by the locking rod.

9. A ski carrier according to claim 8, further including supporting arms provided on the leg of the U-shaped carrying member and extending into the gutter, the clamping lever being comprised of a housing, which is pivoted to the leg of the U-shaped carrying member above said supporting arms, the housinglike clamping lever provided at its upper end with a tongue, which in the clamping position of the clamping lever extends into an opening of the leg of the U-shaped carrying member and which has at its free end a bore for receiving the locking rod, the upper part of the fixing bracket comprising a housing, which is pivoted by a pivot in the housinglike clamping lever and which by means of slots is mounted in said housinglike clamping lever to permit of a movement of the fixing bracket in its longitudinal direction, and a spring which engages at one end the fixing bracket and at the other end the pivot, the fixing bracket moving in its longitudinal direction against the force of said spring.

10. A ski carrier according to claim 9, characterized in that the pivot of the fixing bracket is rotatably and axially non-displaceably mounted in the housinglike clamping lever, a middle portion of said pivot constitutes a spring abutment, which is provided with a guide pin, and a helical compression spring guided by said guide pin, and the other end of said helical spring bearing on a transverse wall of the housinglike upper portion of the fixing bracket.

11. A ski carrier according to claim 7, characterized in that each said leg of each said U-shaped carrying member is provided with one of said locking rods, which is longitudinally slidably mounted in said leg, a spring operatively positioned to urge said locking rod to its locking position, and a slider provided on said locking rod, said slider extending outwardly through an opening in the leg of the U-shaped carrying member.

12. A ski carrier according to claim 7, characterized in that the actuating members have holes and the locking rods are slidable into these holes when the locking elements are in an open position.

* * * * *